(12) United States Patent
Spiro

(10) Patent No.: US 11,901,718 B1
(45) Date of Patent: Feb. 13, 2024

(54) MONO-POINT CEILING SUSPENDED DEVICE CONNECTOR WITH INTEGRAL PLUMBING AND ORIENTATION ALIGNMENT MECHANISM

(71) Applicant: Exposure Illumination Architects, Inc., Scottsdale, AZ (US)

(72) Inventor: Daniel S. Spiro, Scottsdale, AZ (US)

(73) Assignee: EXPOSURE ILLUMINATION ARCHITECTS, INC., Scottsdale, AZ (US)

( * ) Notice: Subject to any disclaimer, the term of this patent is extended or adjusted under 35 U.S.C. 154(b) by 0 days.

(21) Appl. No.: 18/381,231

(22) Filed: Oct. 18, 2023

(51) Int. Cl.
*H02G 3/10* (2006.01)
*H02G 3/08* (2006.01)

(52) U.S. Cl.
CPC ............... *H02G 3/10* (2013.01); *H02G 3/085* (2013.01)

(58) Field of Classification Search
CPC ............ H02G 3/20; H02G 3/08; H02G 3/085; H02G 3/10
See application file for complete search history.

(56) References Cited

U.S. PATENT DOCUMENTS

| | | | | | |
|---|---|---|---|---|---|
| 1,883,621 | A | * | 10/1932 | Olier, Jr. | H02G 3/20 439/529 |
| 1,891,756 | A | * | 12/1932 | Olier, Jr. | H02G 3/20 174/61 |
| 3,985,417 | A | * | 10/1976 | Fenton | H02G 3/20 439/537 |
| 4,645,286 | A | * | 2/1987 | Isban | H02G 3/20 439/537 |
| 4,645,289 | A | * | 2/1987 | Isban | H02G 3/20 439/101 |
| 6,146,191 | A | * | 11/2000 | Kerr, Jr. | H02G 3/123 439/537 |
| 11,050,230 | B1 | * | 6/2021 | Gretz | E04B 9/006 |
| 11,788,692 | B1 | | 10/2023 | Spiro | |
| 2016/0365691 | A1 | * | 12/2016 | Khazeni | H02G 3/22 |
| 2019/0013658 | A1 | * | 1/2019 | Thomas | H02G 3/0616 |
| 2022/0243741 | A1 | * | 8/2022 | Wang | F16M 13/027 |

* cited by examiner

*Primary Examiner* — Hoa C Nguyen
*Assistant Examiner* — Amol H Patel
(74) *Attorney, Agent, or Firm* — XSENSUS LLP

(57) ABSTRACT

A mechanical fastener couples the J box the support structure above through bores disposed at the roof of the J box. At least one such bore can be slotted. The J box can have a plumbing tool coupled. The plumbing tool can be detachable. The J box or the J box and the J box cover can have at least one knock out opening for power or power and data conductor/s conveyance.

22 Claims, 8 Drawing Sheets

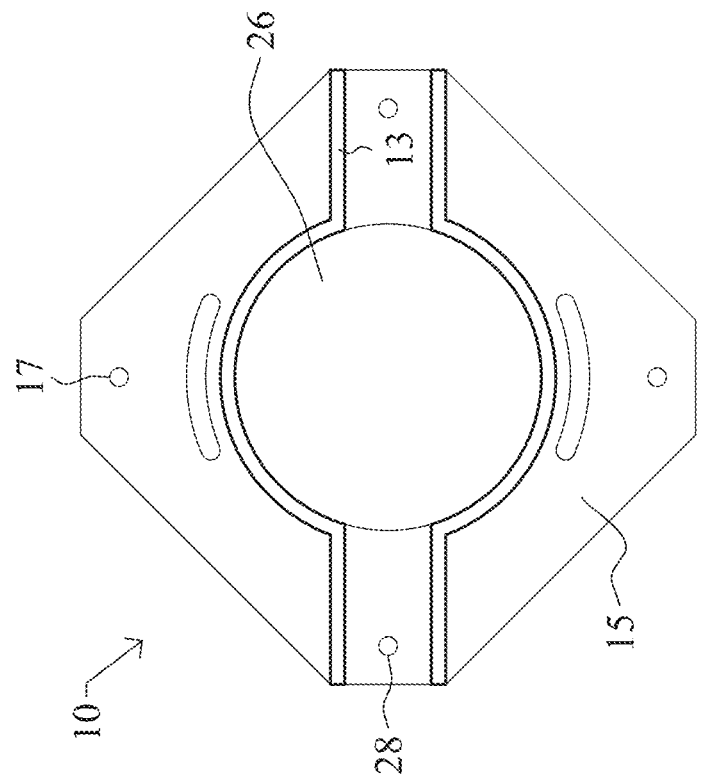
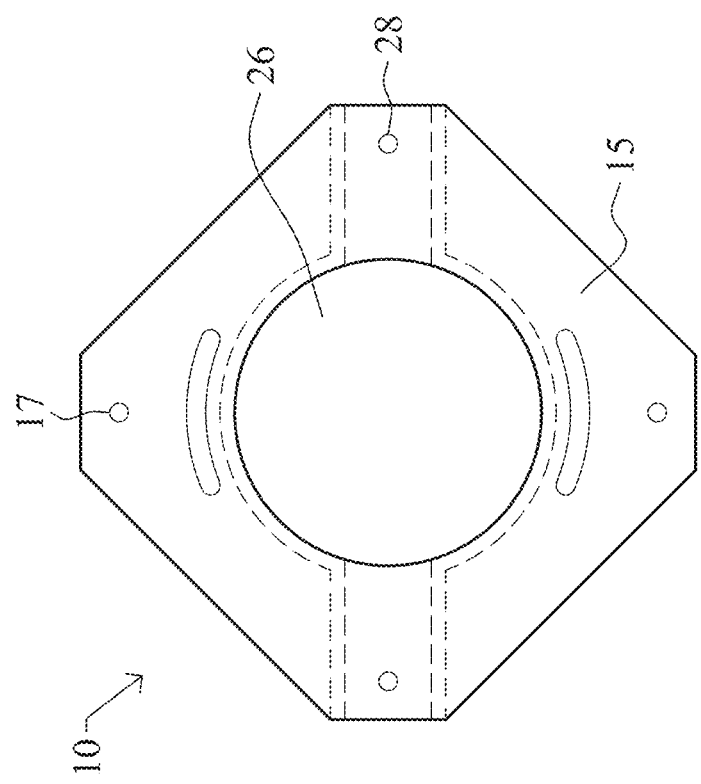
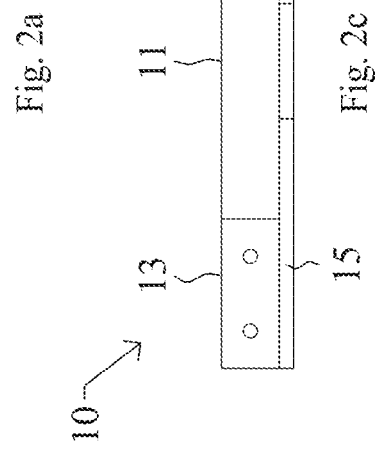
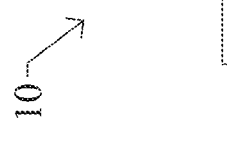

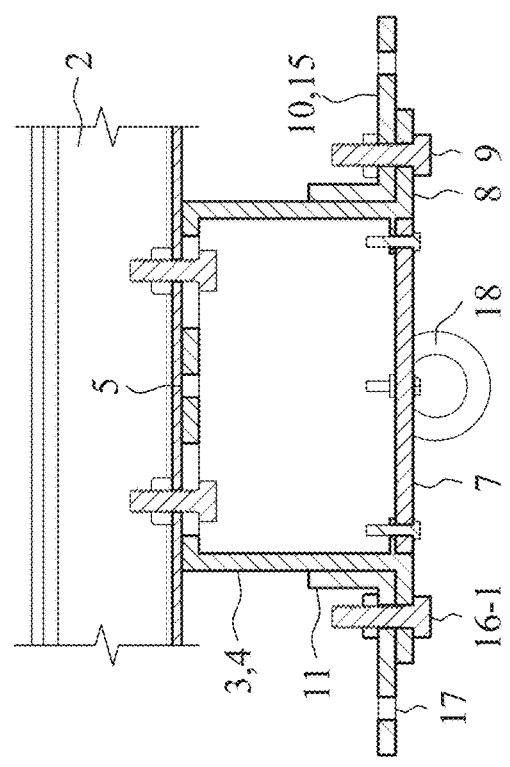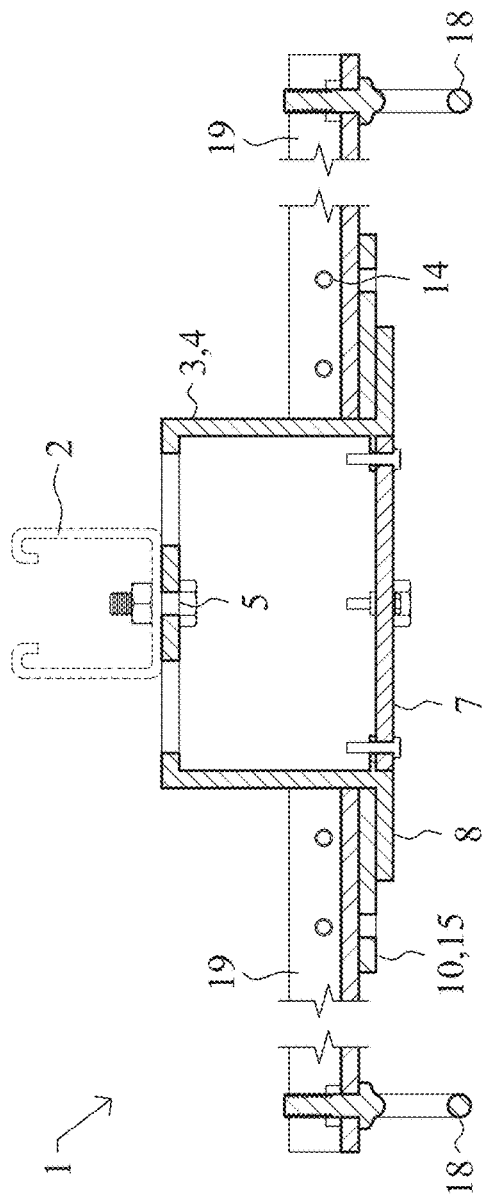

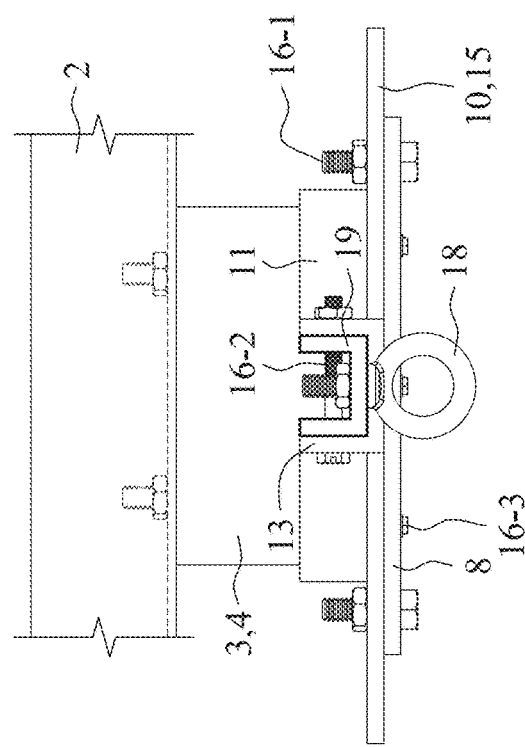
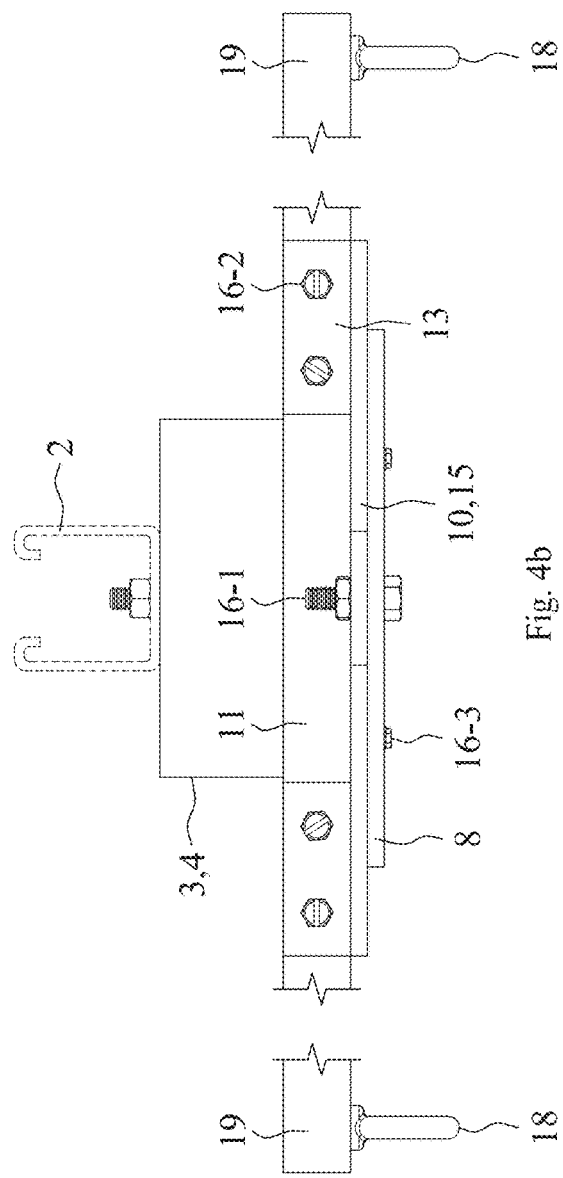
Fig. 4a
Fig. 4b

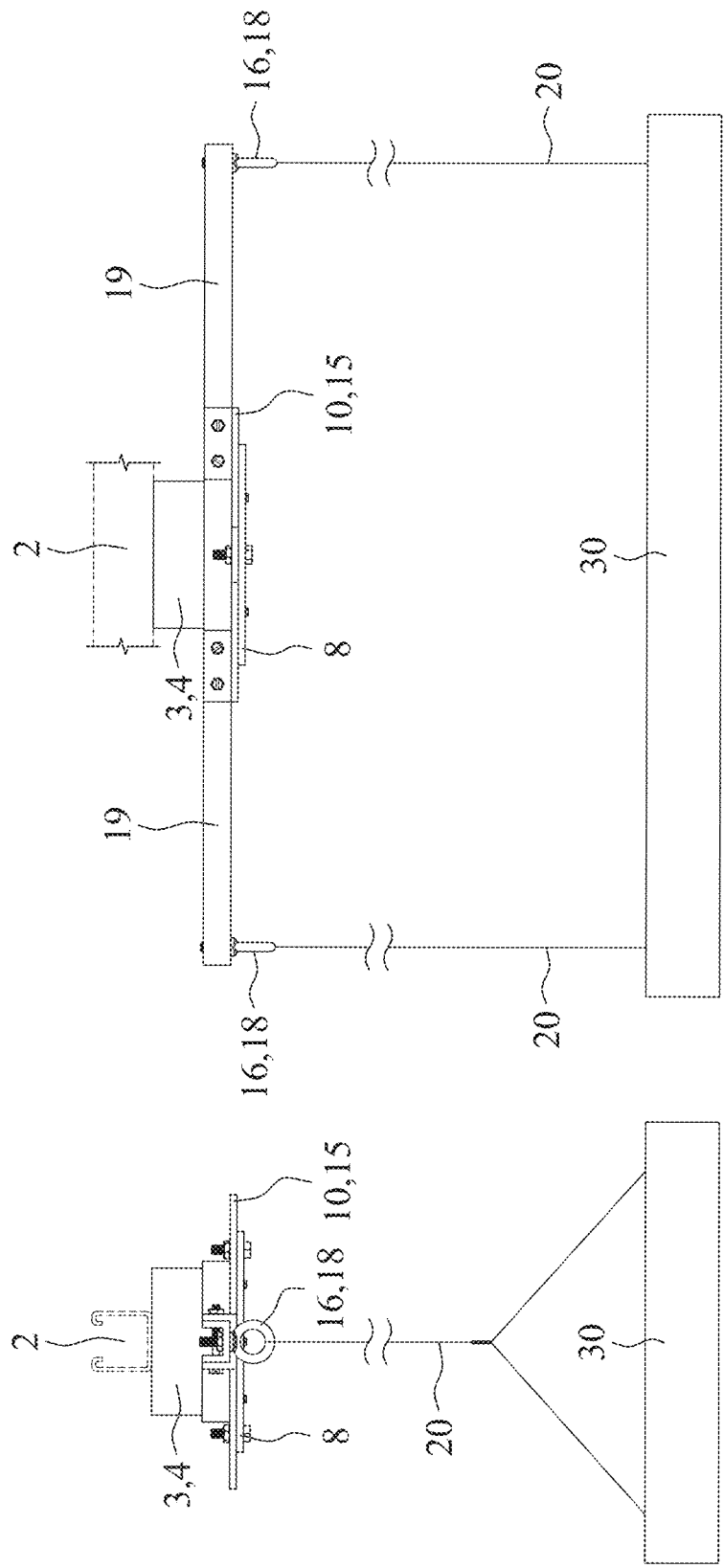

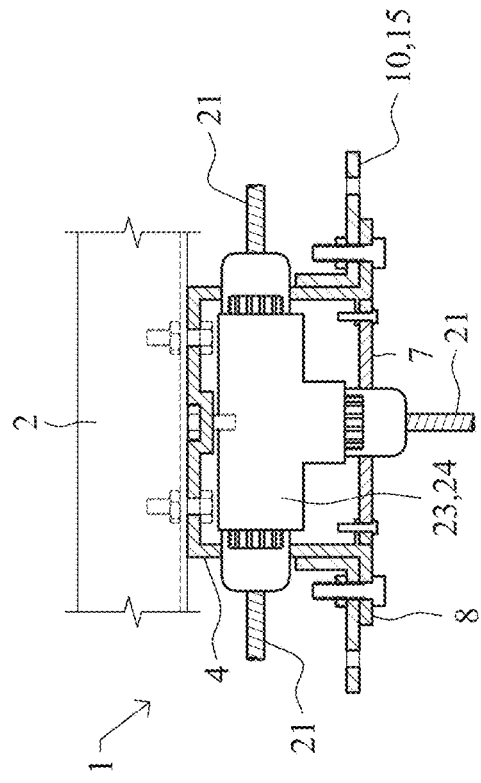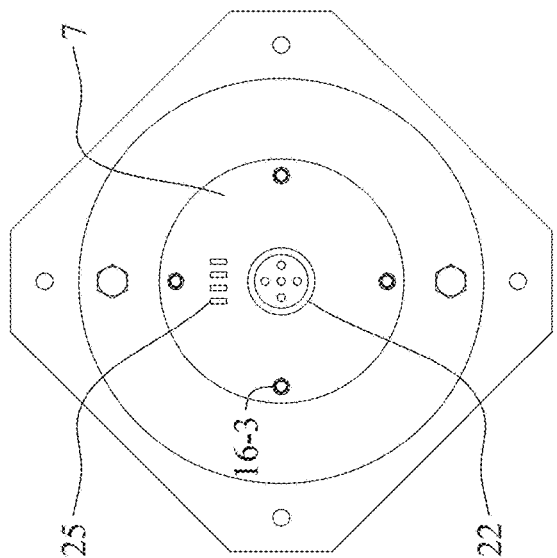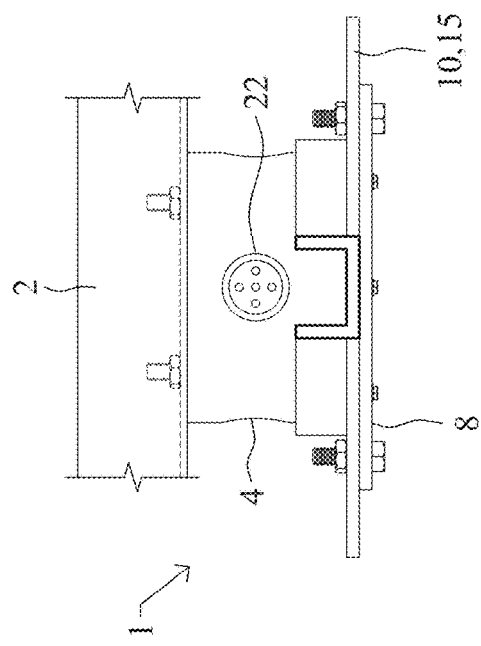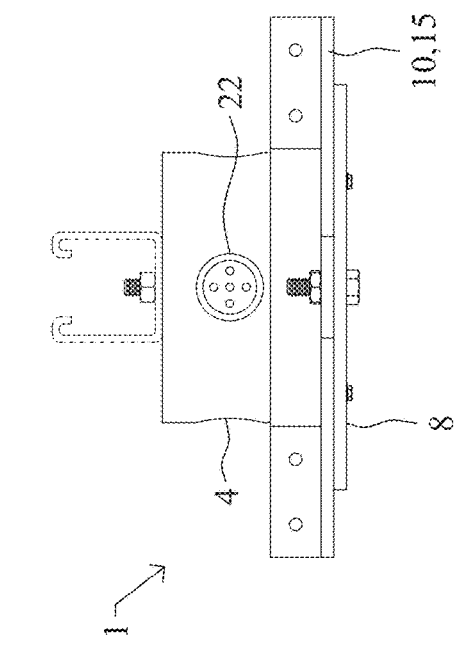

MONO-POINT CEILING SUSPENDED DEVICE CONNECTOR WITH INTEGRAL PLUMBING AND ORIENTATION ALIGNMENT MECHANISM

CROSS-REFERENCE TO RELATED APPLICATION

The present application has common inventorship with, and contains subject matter related to that disclosed in U.S. Pat. No. 11,788,692 the entire contents of which being incorporated herein by reference.

BACKGROUND

Technical Field

The present disclosure relates to a mechanical/electromechanical connector for a suspended ceiling device with an integral mechanism for suspended ceiling device plumbing and orientation.

Discussion of Background

Ceiling mounted suspended devices that are required to align with other ceiling suspended device(s) commonly require more than one point of mounting connectivity to a structure above. These mounting points of connectivity may be connected to a primary ceiling structure or to a secondary structure that couples to the primary structure. It is uncommon for all primary ceiling structure features of a building to be located directly above a plurality of mounting points for a ceiling suspended device. More commonly, an installer is required to install at least one additional secondary support structure with a device mounting point before extending a device suspension element from that mounting point. The suspended device is suspended from the at least two mounting points by at least one of a chain or an aircraft cable. The device suspended from the ceiling is typically required to be plumb, and/or oriented to align with at least one neighboring device mounted at the same height. The device suspended from the ceiling can be electrically powered as is the case with ceiling suspended lighting devices.

Power to ceiling mounted lighting devices is typically conveyed to the devices through ceiling mounted junction boxes ("J boxes"). The J boxes are typically positioned above or in proximity to the ceiling mounted devices. The ceiling mounted devices can be coupled to a J box by a rigid conduit. The J box can have a swivel joint connector that can restore at least the mounting elevation of the coupled device once it bumped by a moving object. However, the swivel connector does not restore the lighting device alignment with like neighboring device/s. Further, if the device's center of gravity is not co-aligned with the longitudinal vertical axis of the conduit, the device is subjected to undue stress.

In industrial and commercial buildings J boxes coupled to the ceiling's primary and/or secondary structures are fabricated of metal. The metal J boxes inherently have the structural capacity to support the weight of the suspended luminaires with their respective suspension elements. The ceiling suspended devices can receive their power or power and data from the J boxes coupled above or from conductors external to the J box. For example, an array of highbay lighting devices can receive power, or power and data, from a modular wiring system having a drop cord connect the powered device from the above structure.

Since the form, the size, the weight, and the center of gravity of the devices suspended from above vary, in some applications two mounting points of suspension from the ceiling may be required. Yet to save material costs and production time, installers prefer suspending ceiling suspended device/s requiring alignment by a mono-point connection.

SUMMARY

The present disclosure describes a mono-point means of device suspension from a structure (e.g., ceiling) with plumbing and alignment (vertical and/or horizontal) capabilities. Furthermore, the present innovation is suitable for electrified and non-electrified applications.

The present inventor recognized a need for a mono-point mounting connection to a ceiling structure and a need to suspend from the mono-point connector a device by at least two mounting points. The device itself can be suspended from an overhead structure by way of a cable and/or chain. It is noted that the J box has at least one of a mechanical load bearing capacity and an electrical conveyance capacity that serves as an electrical source to one or more components that act as electrical loads.

The disclosure of the present embodiment describes how a modified traditional J box can satisfy all mechanical or electromechanical demands on a mono-point connector for a ceiling suspended device. In at least one different embodiment (not shown), a structural member having the same or similar form and mechanical properties to the J box as described herein can replace the J box. Thus, aspects of the embodiments are combinable.

The present embodiment includes at least one of a J box and a hub. The J box can be a circular or substantially circular enclosure with an opening to the below. The opening is sized to be covered by a standard J box cover. At least the top side of the J box mechanically couples to a structure that directly or indirectly couples to the ceiling structure above.

In at least one embodiment a mechanical fastener couples the J box to a support structure above through bores disposed at the upper side of the J box. At least one such bore can be slotted. The J box can have a plumbing tool coupled thereto. The plumbing tool, such as a bubble level, can be detachable. The J box, or the J box and the J box cover, can have at least one knock out opening for conveyance of power or power and data conductor/s.

Unlike the conventional J box form, the modified J box according to the present embodiment also has a coupled flange located at the bottom end of the J box in proximity to the J box covered opening. The flange can be unitarily formed with the body of the J box. The flange extends outwardly from at least a portion of the J box exterior wall/s. The flange is configured to support the weight of a suspended device, the corresponding suspension cable and/or chain and a hub with or without other attachment/s. The flange can have at least one through bore configured to engage a mechanical fastener that secures a coupled hub to the J box. In other embodiments, the hub can be secured to the J box by fastening device/s located at at least one different location.

The hub is a substantially planar structure that has a through opening. The hub's through opening size is greater than the size of the J box diameter and its shape is substantially similar to the circular or the substantially circular shape of the J box. The hub is configured to rest on the top surface of the flange of the J box. The hub optionally includes at least one through or non-through elongated bore. The elongated bore can be located on at least one side of the hub. A mechanical fastener inserted through at least one bore in the flange of the J box can fixedly couple the hub to the J box.

The hub optionally includes a collar. The collar's inner wall is configured to be in proximity to at least one exterior wall of the J box. In at least one different embodiment (not shown) a mechanical fastening device (e.g., screw, bolt, rivet, adhesive or the like) secures the hub to the J box through the collar.

The hub that is placed on the flange is partially or fully free to rotate about the vertical axis of the J box that is coupled to the above structure. The hub, rotated into linear alignment with at least one neighboring device, can be secured to the flange of the J box by at least one mechanical faster. The mechanical fastener can secure the hub against lateral rotation and vertical movement by at least one coupling fastener that can couple the hub to the J box flange through the elongated bore. In a different embodiment, the location of the fastener/s coupling the hub to the J box can be along the collar or elsewhere.

The hub can have at least one connection mounting point to couple at least two suspension cables and/or chains to the J box and/or the J box cover. The present embodiment includes two connection mounting points on the hub at opposite sides of the J box. The mounting points shown are bores to which chains and/or cables can be coupled. Further, in at least one alternate embodiment, an eye loop fastener or a hook can be coupled to the hub through the bores. The chains and/or the cables can then be coupled to the eye or hook fasteners.

The present embodiment has at 90° to the coupling bores protrusions extending upwardly from the top surface of the hub. These protrusions are configured to mechanically couple to extenders that originate from the top surface of the hub at opposite sides of the J box and extend outwardly. The extenders can couple to upwardly protruding walls and/or the hub's surface by fasteners. The fasteners can be inserted through bores in the upward protruding walls, the extenders, and/or the hub's planar surface.

The extenders in at least one embodiment can extend sufficiently outwardly to enable the coupled suspension cables and/or chain coupled to a device below to be substantially or fully vertically oriented. In at least one different embodiment (not shown), the hub can be formed to couple the extender from below or in combination with other specified or un-specified arrangement. When an extender is not used, a device safety cable or chain can be coupled to safety bores disposed in the hub's disk between the protrusion walls.

The hub material can be metallic or non-metallic material. The hub's structural properties require its ability to support the weight of at least the suspended device, the corresponding suspension elements, and its own deadweight. In at least one alternate embodiment where a J box is not used, the profile of the hub as it couples a support structure similar in profile to a J box with a flange can remain the same.

Returning to the J box, in at least one embodiment power or power and data can be conveyed to the suspended device below through the J box. It is further noted that the present innovation can invite a new class of modular wiring wherein the modular wiring components (e.g., a plug that receives a plurality of conductors in a predetermined spatial arrangement, and provides electrical connectivity of the plurality of conductors to corresponding wires that are connected in a same predetermined spatial arrangement in a plug that marries with the plug) can couple the J box in a form of plug'n play. For electrified systems that do not employ a conduit extender to couple a device to a J box, using the mono-point J box connector offers reduced material and faster production time.

While the hub and the J box arrangement enable precise lateral alignment of a ceiling suspended device with at least one neighboring like ceiling suspended device, the present disclosure employs conventional device mounting methods for device mounting height. For example, two methods can be used to match the mounting height of one ceiling suspended device to a like neighboring device. The first method entails plumbing the J box to the coupled structural member above using pre-measured hub coupled cables and/or chains to couple to the suspended device below. The second method entails trimming the length of the suspended cables and/or chains to specified height/s across the bottom face of the device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 2a, 2b, 2c, and 2d show top, bottom, and side views of the hub, respectively.

FIGS. 3a and 3b show sections, at 90 degrees to one another, through an assembly that includes a J box, a hub, and extenders.

FIGS. 4a and 4b show respective elevations of the assembly that includes a J box, a hub, and extenders.

FIGS. 7a and 7b show the front and side views, respectively, of an exemplary luminaire supported by a J box with a hub and extenders.

FIGS. 8a and 8b show elevation views at 90° to one another of the connector assembly with electrical receptacle. FIG. 8c shows a vertical section of a J box with several receptacles. FIG. 8d shows a bottom view of a J box assembly with an electrical receptacle disposed in the J box cover.

DETAILED DESCRIPTION

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

Figure 1A:
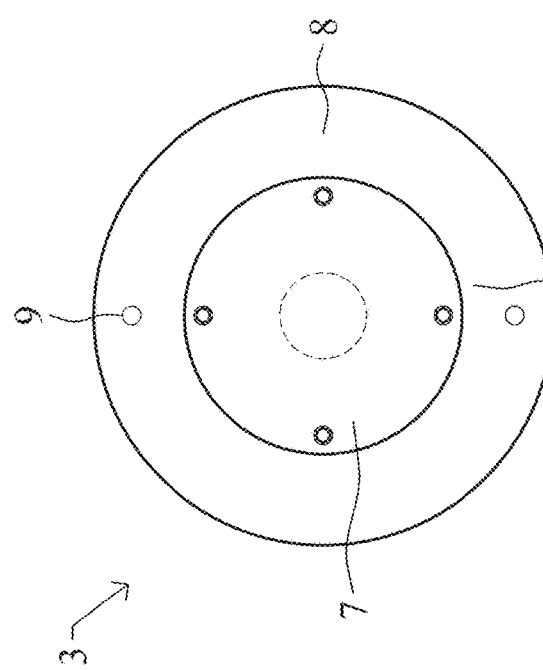
FIGS. 1a, 1b, and 1c show top, bottom, and side views of the J box, respectively.
Figure 1B:
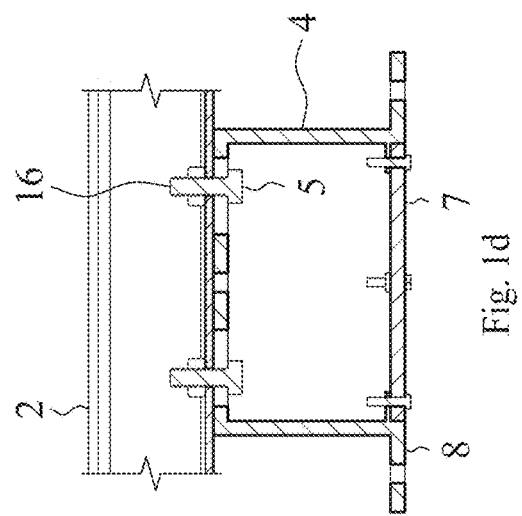
Figure 1C:
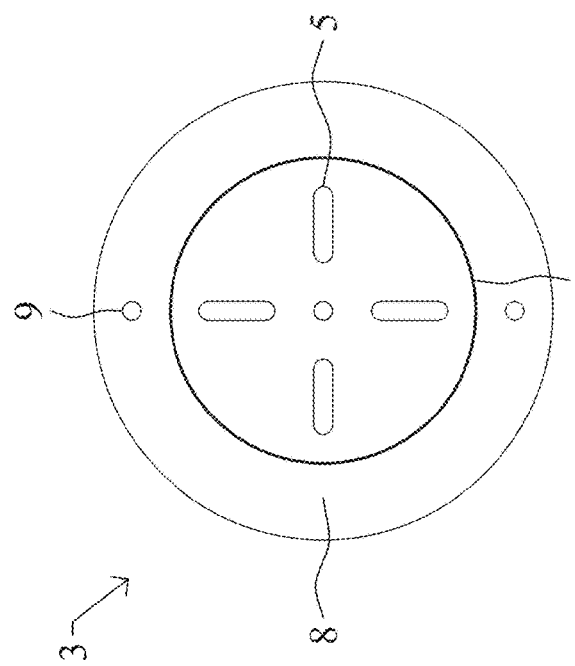
Figure 1D:
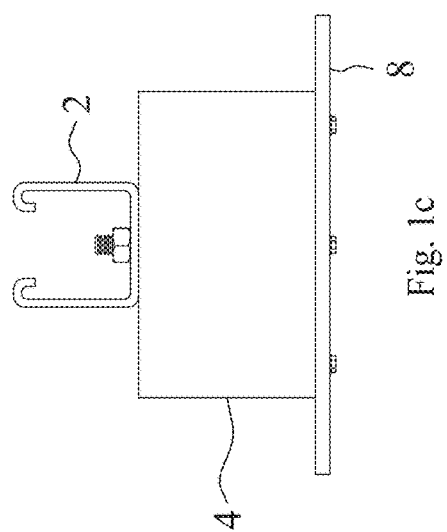
FIG. 1d shows a vertical cross-section through the J box.

FIGS. 1a, 1b, and 1c show top, bottom, and side views, respectively, of the J box. FIG. 1d shows a vertical cross-ssection through the J box. More particularly, FIG. 1a shows a top view of the J box 3. The J box 3 includes a circular or a substantially circular enclosure extending upwardly from at least a partial flange 8 coupled to the exterior wall 4 of the J box 3. Two device alignment bores 9 shown on opposite sides of flange 8 are configured to receive a through fastener (not shown). The fasteners extend through elongated bores in a hub that rests on the top surface of the J box coupled flange 8 (not shown). The fasteners secure a hub to the J box 3.

The hub coupled to a ceiling suspended device is rotatable about the central axis of the J box 3 which enables it to be aligned with at least one like neighboring ceiling suspended device (not shown). Several coupling bores 5 allow for coupling to a support structure, and the coupling bores 5 are shown on top of the J box 3 circular enclosure, and can be configured to have multi-directional connectivity to above support structure. FIG. 1*a* shows four coupling bores 5 that allow coupling fasteners to couple the J box 3 to a support structure, as well as a single bore at the center that is non-slotted. At least one bore of the coupling bores 5 can be recessed from the top planar surface of the J box 3 and can be used to couple a power consuming device inside the J box's 3 enclosure (not shown).

FIG. 1*b* shows the bottom view of the J box 3. A J box cover 7 covers the interior of the J box 3 enclosure. The J box cover can be coupled to at least one of, a knockout opening, a receptacle, a switching device, a conductor, a perforated opening, and a fastener (not shown). At least one power consuming device can be coupled to the exterior surface of the J box cover 7 (not shown). The coupled device/s can include at least one of, a sensing device, a communication device, a processing device, and an output device.

The J box flange 8 shown around the J box cover 7 shows a circular form. In a different embodiment the flange 8 can take a different form. The two device alignment bores 9 are shown at opposite sides of the J box flange 8. In a different embodiment at least one fastener coupling a hub to the J box flange through the device alignment bore 9 can secure the hub from lateral and upwardly movement.

FIG. 1*c* shows a side view of the J box 3 coupled to a ceiling support structure 2 above. The height of the J box exterior wall 4 can be set as high as needed for particular installations, or can be set at a standard height. When the J box 3 only provides mechanical connectivity, the J box 3 can be rather shallow (e.g., 2" or 1"), whereas when the J box retains power conveyance and/or power consuming device/s, the height of the J box 3 can increase (e.g., 2", 3", or greater).

FIG. 1*c* also shows the flange 8 of the J box coupled to the exterior wall/s of the J box 4 in proximity to the wall's bottom side. The flange 8 is a planar surface that extends outwardly from at least one portion of the exterior wall/s of the J box 3. The flange is configured to support the weight of at least one hub and a ceiling mounted device along with at least two cables and/or chains and/or two extenders (not shown).

FIG. 1*d* shows a vertical section through a J box 3 that is coupled to a ceiling support structure 2. The J box flanges 8 are shown to extend outwardly with the J box cover 7 therebetween. At the top of the J box 3 enclosure, J box coupling bores 5 are shown with two fasteners 16 coupled to the above support structure 2.

FIGS. 2*a*, 2*b*, 2*c*, and 2*d* show respective top, bottom, and side views of the hub.

FIG. 2*a* shows a top view of a hub 10. The hub 10 is configured to provide orientation-setting capability to a ceiling suspended device that employs at least one mounting point. Structurally, the hub 10 can support the weight of at least one of, a suspension cable, a chain and conduit, an eye loop/hook fastener, the hub's own weight, and a suspended device (not shown). In an alternate embodiment, the hub 10 also supports the weight of at least one extender (not shown).

FIG. 2*a* also shows the hub 10 to be formed of a planar disk 15. The planar disk 15 is configured to rest on the flange of the J box (not shown). The perimeter of the planar disk 15 can have several geometries. The present embodiment shows an octagon form with a central through opening 26. The central through opening 26 has at least in part a circular form. The J box enclosure is configured to extend above the hub through the central through opening 26 of the hub 10 abutting the top surface/s of the J box flange/s to the bottom surface of the hub's 10 disk 15.

The hub planar disk 15 shows two hub mounting bores 17 at opposite sides of the central through opening 26. The hub mounting bores are configured to couple directly or indirectly to at least one cable and/or chain that supports a suspended device below (not shown). A collar 11 extends upwardly around at least a portion of the central through opening 26. The collar 11 abuts the sidewall/s of the J box and is configured to provide a consistent rotational path for the hub around the central vertical axis of the J box. The collar 11 can provide stiffening strength to the collar 11 and in a different embodiment can retain at least one fastener that secures the hub 10 to the J box.

The collar 11 shown in FIG. 2*c* turns away from the central through opening 26 to form protrusion 13 walls. The protrusion 13 walls are sized to couple to extenders (not shown). The height of the collar 11 walls and the protrusion 13 walls can be different. The protrusion walls have protrusion wall bores (not shown) sized to receive through fasteners (not shown) that couple extenders that extend outwardly from the central through opening 26 perimeter.

An elongated bore shown between the collar 11 wall and the hub mounting bore 17 is configured to secure the hub 10 to the J box before or after aligning a hub 10 suspended device with at least one other like hub 10 suspended device (not shown). The hub's disk 15 rests on the flange of a J box and is rotatable about the central axis of the J box so as to align a coupled suspended device below with such a neighboring device. Once aligned, the hub can be secured to the J box by at least one through fastener coupling the monopoint connector key elements together.

FIG. 2*b* shows a bottom view of a hub 10. The bottom surface of the hub 10 is configured to couple to the flange of the J box. Except for the collar and the protrusion walls all other elements reflect the same elements as shown on the top surface of the hub 10. The collar and the protrusion walls are shown in dashed line.

FIG. 2*c* shows a side view of the hub 10. The side shown is the side configured to receive a cable and/or a chain with a coupled suspended device (not shown). The view shows a suspended ceiling device cable and/or chain (not shown) directly coupled to the hub. The elements shown include a collar 11, a disk 15, and protrusions 13. At both sides, the protrusion 13 shows two protrusion bores 14. The bores 14 are configured to receive extenders (not shown).

FIG. 2*d* shows a side view of a hub 10 rotated at 90° to the view shown in FIG. 2*c*. The view shows a suspended ceiling device cable and/or chain coupled to an extender (not shown). The present embodiment of the hub offers two alternate mounting methods to suspend a device from the hub 10. In FIG. 2*c* the cable/s and/or the chain/s couple directly or by way of a fastener to the hub's disk 15. In FIG. 2*d*, an extender that is coupled to the protrusion 13 and/or the disk 15 extends outwardly. The cable and/or chain mounted device couples to the extender (not shown).

In addition to the suspended device approach of coupling to the above mounted connector 1, there may be a safety requirement for a secondary support system for the device to protect occupants when the primary suspension means fails. FIG. 2b shows safety bores 28 disposed between the protrusion 13 walls of the hub's 10 disk 15. When extenders are not used, a safety cable or chain can couple to these safety bores 28. Conversely, when extenders are used, the device alignment bores 9 can couple the safety cable or chain.

FIGS. 3a and 3b show sections through an assembly that includes a J box, a hub, and extenders. FIG. 3a shows a vertical section through a connector 1 coupled to a support structure 2. The connector 1 includes two main elements: the J box 3 and the hub 10. The hub's disk 15 is shown resting on the J box flange 8. Mechanical fasteners 16-1 are shown securing the hub 10 to the J box 3. The mechanical fasteners can couple the hub 10 to the J box before or after coupling to the hub 10 at least one ceiling suspended device (not shown). The mechanical fasteners secure the hub 10 to the J box 3 through the device alignment bore 9 in the J box 10 flange 8.

The present section also shows an eye loop/hook fastener 18, a J box cover 7, a hub mounting bore 17, a hub collar 11, a J box exterior wall 4, and a J box coupling to structure bore A fastener coupled to the hub mounting bore 17 (not shown) supports a coupled cable and/or chain with a suspended device coupled below (not shown). In a different embodiment, the cable and/or chain of the suspended device coupled below can directly couple to the hub 10 through the hub mounting bore 17.

FIG. 3b shows a transverse view section of the connector 1 shown in FIG. 3a. The present figure shows extenders 19 extending outwardly from the proximity of the exterior walls 4 of the J box 3 exterior. An eye loop fastener 18 is shown coupled to the extenders 19 in proximity to their respective outer ends. Two protrusion bores extending into the walls of the extenders 19 at both side of the J box 3 are configured to receive a coupling mechanical fastener (not shown).

The J box cover 7 is shown covering the J box 3 enclosure from below and a support structure 2 is shown coupled to the J box 3 by a mechanical fastener through fastener 5 above. The present embodiment shows the extender 19 coupled to the protrusion walls disposed above the hub disk 15 wherein the hub disk 15 abuts the top surface of the J box 3 flange. In a different embodiment the extender 19 can be coupled differently to the hub 10 and can have a different form and/or profile.

FIGS. 4a and 4b show side views of the assembly comprising a J box, a hub, and extenders.

FIG. 4a shows a side view of a connector 1 coupled to a support structure 2. The connector 1 comprises two key elements, the J box 3 and the hub 10. The hub's 10 disk 15 is shown resting on the J box flange 8. Mechanical fasteners 16-1 shown on both sides of the J box 3 secure the hub 10 to the J box 3. The mechanical fasteners can couple the hub 10 to the J box before or after coupling to the hub 10 at least one ceiling suspended device (not shown).

A collar 11 surrounding a J box 10 enclosure and a pair of protrusion 13 walls are shown extending upwardly from the top surface of the hub's disk 15. The collar abuts the J box exterior surface 4 wherein the protrusion 13 walls in the present embodiment are configured to couple to an extender 19. An eye loop fastener 16-2,18 shown coupled to the extender 19 is configured to couple to a suspended cable and/or chain that couples a device below. Fasteners 16-3 that couple the J box cover 7 to the J box 3 are shown below the J box flange 8.

FIG. 4b shows a transverse side view of the connector 1 shown in FIG. 4a coupled to a support structure 2 above. Also shown are partial sections of the extenders 19 extending outwardly from the proximity of the exterior walls 4 of the J box 3. An eye loop fastener 18 is shown coupled to the extenders 19 in proximity to their respective outer ends. The extenders 19 are coupled to protrusions 13 by two through fasteners 16-2 extending through the protrusions' 13 walls. At opposite sides of the J box 3, J box cover fasteners 16-3 are shown, configured to couple the J box cover to the J box (not shown).

Fastener 16-1 couples the hub disk 15 to the flange 8 of the J box 3 through the device alignment bore (not shown). The hub's disk 15 orientation can be aligned with at least one neighboring hub's disk 15 by rotating the disk 15 about the vertical axis of the J box 3 enclosure. By so doing, the fastener 16-1 can secure the alignment of a coupled suspended device to a neighboring suspended device. It is noted that regardless whether the cable and/or chain suspended device is coupled to the hub 3 or to an extender 19, the hub 3 with its lateral orientation capability governs the orientation of the coupled device below (not shown).

Figure 5A:
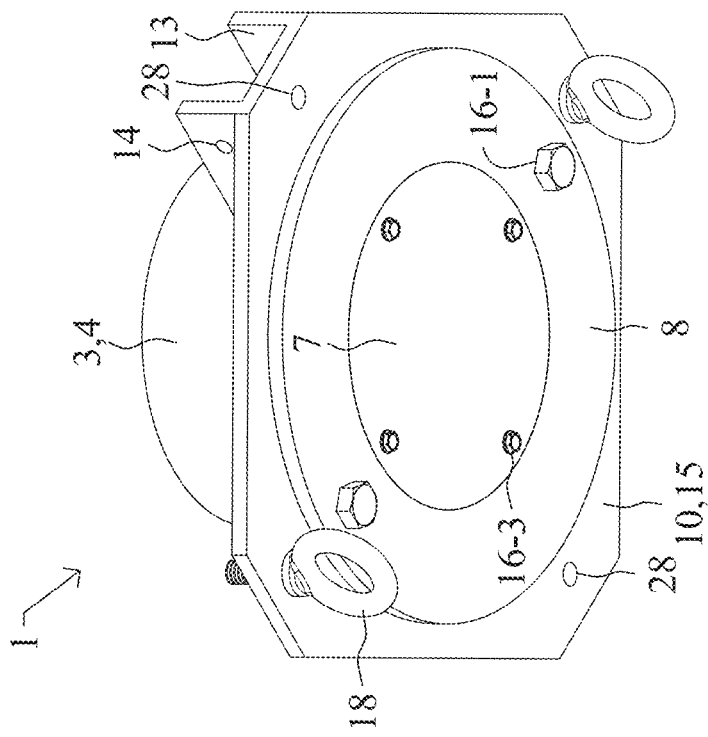
FIGS. 5a and 5b show top and bottom perspective views, respectively, of the J box with the hub assembly.
Figure 5B:
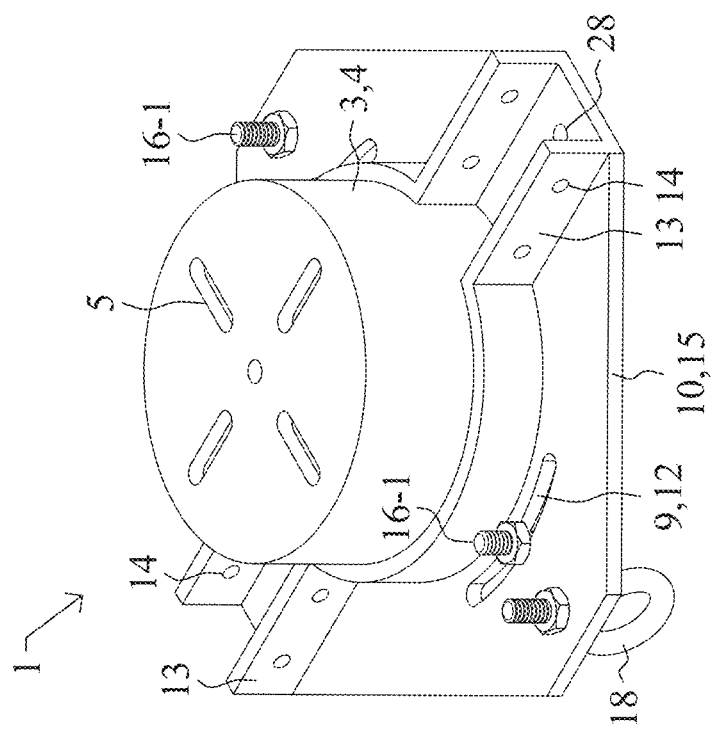

FIGS. 5a and 5b show top and bottom perspective views of the J box with the hub assembly.

FIG. 5a shows a top perspective of a connector 1. The connector 1 includes two main elements: a hub 10 and a J box 3. The hub elements include a planar disk 15 that is coupled to a collar 11 and protrusions 13. The hub's disk can have a through bore (not shown) that receives a fastener 16, 18. The hub's disk can have an elongated bore 12 referred to herein as the device alignment bore 9 configured to receive a device alignment fastener 16-1.

The protrusion 13 walls have two protrusion wall bores 14 at the opposite sides of a J box 3 enclosure. These bores are configured to receive through fasteners that couple extenders (not shown) that extend outwardly and away from the J box 3 enclosure. In at least one embodiment, a safety bore 28 in the hub's disk 15 can couple to a secondary cable and/or chain to protect occupants from harm in the event the primary means of the device suspended below fails.

The exterior wall of the J box 4 is shown between the hub's collars 11 extending above the hub's disk 15. The top surface of the J box is flat and has several bores. At least one of the bores is configured as a J box coupling bore 5 to a support structure above (not shown). The bore 5 can be slotted to enable omni-directional coupling. In addition, at least one bore can be configured to couple device/s retained inside the J box 3 interiors. The bores formed in the top flat surface of the J box can be elongated and the surrounding of at least one bore can be raised or depressed.

FIG. 5b shows a bottom perspective of the connector 1. The hub's 10 disk 15 is shown supported from below by the flange 8 of the J box 3. Fasteners 16-1 couple the hub 10 to the flange 8 of the J box 3. The fasteners 16-1 inserted through the device alignment bore (not shown) extend upwardly through the elongated bore (not shown) and are secured to the top surface of the hub's 10 disk 15. The J box 3 enclosure's opening is shown enclosed by the J box cover 7 secured to the J box' embodiment by fasteners 16-3.

Hub mounting bores disposed in the disk 15 at opposing sides of the J box 3 are shown to be occupied by eye loop fasteners 18. In at least one embodiment, a suspended ceiling device can couple to the fasteners 18. In yet a different embodiment, a cable and/or a chain (not shown) can directly couple to the disk 15 through the bores. Safety bores 28 also disposed in the disk 15 of the hub 10 are positioned perpendicularly to the bores occupied by the eye loop fastener 18.

These safety bores 28 are sized to directly or indirectly receive a secondary suspension cable or chain that provides additional protection to occupants when the primary mounting suspension system fails. When extenders are used with the connector 1, the bores retaining the eye loops 18 can become the safety bores 28 that provide additional protection to occupants when the primary mounting suspension system fails.

The connector assembly elements shown above the disk 15 of the hub 10 include protrusions 13 with through protrusion bores 14, and the exterior wall 4 of the J box 3 enclosure.

Figure 6B:
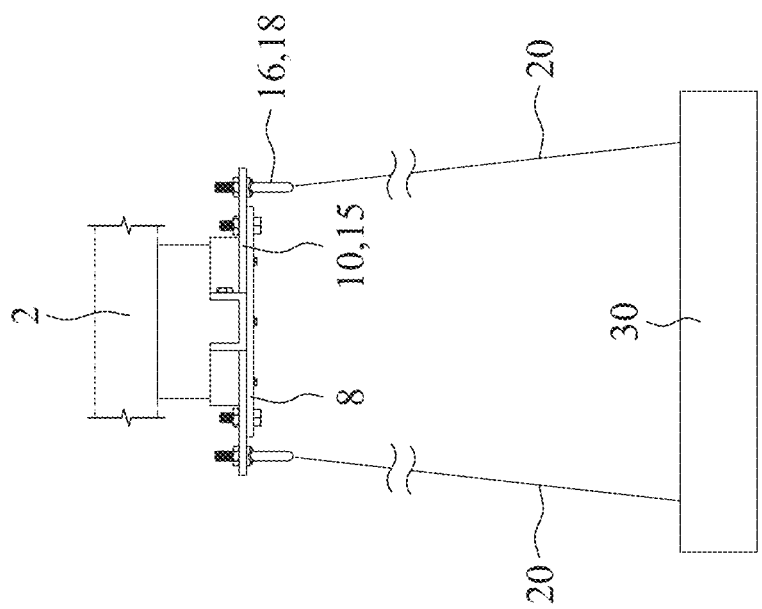
FIGS. 6a and 6b show front and side views, respectively, of an exemplary J box with a hub supporting a suspended luminaire.
Figure 6A:
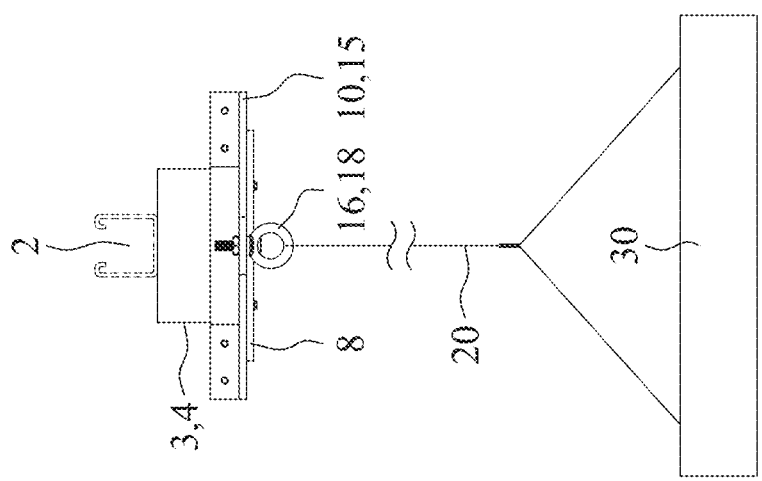

FIGS. 6a and 6b show front and side views of an exemplary J box with a hub supporting a suspended device below.

FIG. 6a shows a side view of a suspended device 30 coupled by at least one of a cable and/or chain 20 to an eye loop fastener 16, 18. The eye loop fastener is coupled to a hub mounting bore (not shown). The hub's 10 disk 15 rests on the flange 8 of the J box 3. The J box 3 is shown coupled to a support structure 2 above.

FIG. 6b shows a transverse side view of the view shown in FIG. 6a. FIG. 6b shows two device support cables and/or chains 20 suspended from two eye loop fasteners 16,18 coupled to the hub's disk 15 at opposite sides of a J box 3 enclosure. The disk 15 of the hub 10 is shown resting on the J box 3 flange 8 coupled from below to a support structure 2 above.

FIGS. 7a and 7b show the front and side views of an exemplary luminaire supported by a J box with a hub and extenders.

FIG. 7a shows a hub 10 coupled extender 19 front view with a coupled suspended device 30. The device 30 is coupled by at least one of, a cable and/or chain 20 from an eye loop fastener 16, 18. The extender 19 is coupled to protrusions 13 that extend upwardly from the top surface of the hub's 10 disk 15. The hub's 10 disk 15 rests on the flange 8 of the J box 3. The J box 3 is shown coupled to a support structure 2 above. The extender 19 can be configured to extend outwardly from the hub 10 having lengths sufficient to position the suspension cable and/or chain 20 in vertical or substantially vertical in relation to a floor below.

FIG. 7b shows a side view of hub 10 with a coupled extender 19 that supports a suspended device 30. The view shown is a transverse view of the front view shown in FIG. 7a. The device 30 is suspended by cable/s and/or chains 20 from eye loops fastener 16, 18 shown in proximity to the ends of the extenders 19. The extender 19 are coupled to protrusions 13. The protrusions 13 extend upwardly from the top surface of the hub's 10 disk 15. The hub's disk 15 rests on the flange 8 of the J box 3. The J box 3 is shown coupled to a support structure 2 above. The extender 19 can be configured to extend outwardly from the hub 10 having lengths sufficient to position the suspension cable and/or chain 20 in vertical or substantially vertical in relation to a floor below.

FIGS. 8a and 8b show elevation views at 90° to one another of the connector assembly with electrical receptacle. FIG. 8c shows a vertical section of a J box with several receptacles. FIG. 8d shows a bottom view of a J box assembly with an electrical receptacle disposed in the J box cover.

The connector 1 can provide mechanical and electrical connectivity to a device mounted below. The electrical connectivity can be conveyed to a device from the connector externally, and/or internally. Power, or power and data, can be conveyed through at least one of a ridged conduit, a flexible armored cable, modular wiring, a soft cover cord and/or a combination thereof above to the device mounted below. In at least one embodiment an electrical conductor connection to or to and from the connector 1 at least in part can be affixed. In a different embodiment, at least one of the surfaces of the J box and/or the J box cover can retain an electrical receptacle.

The embodiment of FIGS. 8a, 8b, 8c and 8d support the use of a modular wiring system by including a modular connector configured to have at least two receptacles on the exterior wall of the J box and one receptacle on coupled to the J box cover. It is noted that coupling factory preconfigured power conveyance plug n' play electrical cabling to the connector's mechanical functionality results in a significant installation production time when compared to existing electrical industry means and methods.

FIG. 8a shows a front view of a connector 1 configured to receive power or power and data through at least one receptacle 22 shown coupled to the exterior surface of a J box 4. The J box enclosure extends above a hub 10 wherein the hub's disk 15 couples to the J box flange 8 below. The J box couples from below to a support structure 2 above.

FIG. 8b shows a side view of a connector 1 configured to receive power or power and data through at least one receptacle 22 shown coupled to the exterior surface of a J box 4. FIG. 8b shows the transverse view of the view shown in FIG. 8a. The J box enclosure extends above a hub 10 wherein the hub's disk 15 couples to the J box flange 8 below. The J box couples from below to a support structure 2 above.

FIG. 8c shows a vertical section through the connector 1. The J box enclosure can retain at least one of, a circuitry busway and a power consuming device. The present figure shows a circuitry busway 24 coupled to a plurality of power or power and data conductors 21. The conductors 21 can be detachable pluggable into receptacles 22 disposed in proximity to the exterior surface of the J box 3 and couple to the circuitry busway 24.

At least four receptacles 22 can be disposed along the exterior wall of the J box 3, 4. With such capability, the J box 3 with its retained circuitry busway 24 can act as a power or power and data splitter. Power conveyed into the circuitry busway 24 can flow outwardly in at least four directions, three through the side walls of the J box 3, 4 and at least one to the below through the J box cover 7. The exterior receptacles 22 that couple the receiving receptacles 22 of the circuitry busway 24 can be mechanically keyed. The mechanical key provides at least one of, mismatching voltage avoidance, overloading the circuitry busway, and prioritizes operator safety in engaging or disengaging a power line conductor, a neutral conductor, and a ground conductor connectivity.

The present figure shows the busway 24 retained inside the J box 3 enclosure coupled to fastener that is inserted from the top surface of the J box 3 enclosure. The surface around the bore of the fastener can be depressed to avoid conflict with the support structure 2 coupled above. The J box 3 can couple to the support structure 2 above by through fasteners from inside the J box enclosure.

The present figure shows such fasteners 16 placed above the circuitry busway 24 coupled to a support structure 2 above. The circuitry busway 24 with its corresponding receptacles can be configured to be detachable from the J box enclosure and allow unobstructed passage inside the J box 3 enclosure to fasteners 16 configured to mount to the support structure 2 above. The electrical features of the detachable busway 24 can be selected based on the specific power or power and data needs of the location and devices coupled where the connector 1 is mounted.

In addition to the circuitry busway 24 retained inside the J box enclosure, at least one power consuming can be coupled to the connector 1 and/or the J box 3. The power consuming device can include at least one of, a processing, a sensing, a power storing, and a communicating device. The processing device can have resident memory and code. The communication device can be wired and/or wireless. The connector 1 thus provides a host platform for the electronics, sensors and other low voltage circuitry described in U.S. Pat. No. 11,788,692, the entire contents of which is incorporated herein by reference.

FIG. 8d shows the bottom surface of the connector 1 with the J box cover 7 disposed at the center. Fasteners 16-3 shown secure the cover 7 to the J Box 3. At the center of the cover 7 a plug n' play receptacle 22 shown can provide power or power and data connectivity to an electrically coupled device suspended below. Above the receptacle 22, a bank of switches 25 shown can provide control over engaging and disengaging at least one power or power and data circuit. At least one power consuming device can couple to the exterior surface of the J box cover 7, the flange of the J box 8, and the disk 15 of the hub 10.

The connector can provide a plumbing and orientation capability to a mechanical apparatus configured to couple to a mechanical or an electromechanical device suspended below. The connector is a mechanical alignment apparatus that is configured to deliver power and/or power and data to the device suspended below and/or another device coupled directly or indirectly to the connector.

Obviously, numerous modifications and variations of the present disclosure are possible in light of the above teachings. It is therefore to be understood that within the scope of the appended claims, the disclosure may be practiced otherwise than as specifically described herein.

ELEMENT LIST

1. Connector
2. Ceiling Support Structure
3. J Box
4. J Box Exterior Wall
5. Device alignment Bore
6. J Box Knockout Opening
7. J Box Cover
8. J Box Flange
9. Flange Bore
10. Hub
11. Collar
12. Elongated Bore
13. Protrusion
14. Protrusion Bore
15. Hub Disk
16. Fastener
17. Hub Mounting Bore
18. Eye Loop/Hook Fastener
19. Extender
20. Cable and/or Chain
21. Conductor
22. Receptacle
23. Power Consuming Device
24. Circuitry Busway Hub
25. Switching Device
26. Central Through Opening
28. Safety Bore
30. Ceiling Suspended Device

The invention claimed is:

1. A device mounting connector for coupling a device to a support structure, the device mounting connector comprising:
    a junction box (J box) having an enclosure, and a flange,
        the flange at least in part extends outwardly from an exterior wall of the J box in proximity to an opening of the enclosure, the J box further includes
        at least one reciprocating mechanical provision that couples the J box to a hub, and
        at least one bore that provides physical access mechanically coupling of the J box to a support structure above the J box;
    the hub, the hub being substantially planar and having a central through opening, the hub rests on a top of at least a portion of the flange, the enclosure of the J box extends through the central through opening of the hub and above the hub such that the hub is free to laterally rotate at least in part about a vertical axis of the J box, the hub includes
        a fastening provision sized to allow at least one fastening device in the hub to couple directly or indirectly to a cable and/or a chain that couples to the device and suspends the device below the hub; and
    the device, wherein an orientation of the device is aligned with a neighboring suspended device via rotation of the hub, and is secured in place via an alignment fastener that fastens the hub to the flange of the J box so as to maintain the orientation of the device to remain aligned with the neighboring suspended device.

2. The device mounting connector of claim 1, wherein a height and plumb of the device is set by a length of the at least one of the cable and the chain.

3. The device mounting connector of claim 1, wherein the hub has an elongated bore that is aligned with a bore in the flange of a J box and a mechanical fastener fixedly couples the hub to the flange of the J box.

4. The device mounting connector of claim 1, wherein the device mounting connector is configured to provide at least one of a mechanical connection and electromechanical connection to the device while the device is installed.

5. The device mounting connector of claim 1, further comprising at least a partial collar that extends vertically from an inner side of the central through opening of the hub.

6. The device mounting connector of claim 1, further comprising a plumbing tool coupled to the J box.

7. The device mounting connector of claim 1, further comprising the at least one of the cable and the chain that directly and/or indirectly couples the device mounting connector to the device.

8. The device mounting connector of claim 1, wherein the device mounting connector is also configured to deliver power and/or power and data to the device that is suspended below.

9. The device mounting connector of claim 1, wherein the device mounting connector is also configured to deliver power and/or power and data to the device that is suspended below.

10. A device mounting connector for coupling a device to a support structure, the device mounting connector comprising:
    a junction box (J box) having an enclosure, and a flange,
        the flange at least in part extends outwardly from an exterior wall of the J box in proximity to an opening of the enclosure, the J box further includes at least one mechanical provision that couples the J box to a hub, and at least one bore that enables the J box to be coupled to a support structure above the J box; and the hub, the hub having a pair of extenders that extend outwardly in opposite directions to one another, the hub being substantially planar and having a central through opening, at least a portion of the hub rests on a top of the flange, the enclosure of the J box extends through and above the hub such that the hub is free to laterally rotate at least in part about a vertical axis of the J box, wherein the hub is detachably attached to the device and is configured to horizontally rotate about a vertical axis of the J box so as to align the device with a neighboring device that is also suspended from the ceiling, the neighboring device having a substantially common structure as the device.

11. The device mounting connector of claim 10, further comprising a cable and/or a chain that couples to an extender of the pair of extenders and tethers the device below so as to have substantially vertical orientation.

12. The device mounting connector of claim 11, wherein a height and plumb of the device is set by a length of the at least one of the cable and the chain.

13. The device mounting connector of claim 11, wherein the J box is configured to support at least a weight of the device, the hub with the pair of extenders, and the cable and/or the chain.

14. The device mounting connector of claim 10, wherein the hub further comprising a fastener that secures the hub to the flange of the J box.

15. The device mounting connector of claim 10, wherein the device mounting connector is configured to provide at least one of a mechanical connection and electromechanical connection to the device while the device is installed.

16. The device mounting connector of claim 10, further comprising at least a partial collar that extends vertically from an inner portion of the central through opening of the hub.

17. A device mounting connector for coupling a device to a support structure, the device mounting connector comprising:

a junction box (J box) having an enclosure with a knock out opening, and a flange, the flange at least in part extends outwardly from an exterior wall of the J box in proximity to an opening of the enclosure, the J box further includes at least one reciprocating mechanical provision that couples the J box to a hub, at least one bore that enables the J box to be coupled to a support structure above the J box, a first electrical receptacle disposed inside the enclosure that is configured to receive at least one of input power and/or data, and a second receptacle disposed inside the enclosure that is configured to convey at least one power output and/or data;

the hub, the hub being substantially planar and having a central through opening, at least a portion of the hub rests on a top of the flange, the enclosure of the J box extends through and above the hub such that the hub is free to laterally rotate at least in part about a vertical axis of the J box, the hub includes a fastening provision sized to allow at least one fastening device in the hub to couple directly or indirectly to a cable and/or a chain that couples to the device and suspends the device below the hub; and the device, the device being an electrified device that receives electricity via a conductor that couples to the J box, wherein an orientation of the electrified device is aligned with a neighboring suspended electrified device via rotation of the hub, and is secured in place via mechanical connection between the hub and the flange of the J box.

18. The device mounting connector of claim 17, wherein at least one of the first electrical receptacle and the second electrical receptacle includes a modular plug n' play connector.

19. The device mounting connector of claim 17, further comprising a power or power and data bus that extends inside of the J box and is terminated with a plurality of power or power and data receptacles.

20. The device mounting connector of claim 19, further comprising a circuit selector switch that is coupled to at least one of a housing of the J box and a cover of the J box.

21. The device mounting connector of claim 17, further comprising at least one of a sensor, a data port, signal processing circuitry, and a signaling device is electrically coupled to the J box.

22. The device mounting connector of claim 17, wherein the J box is configured to receive power or power and data from a source located above the J box.

* * * * *